(12) United States Patent
Hung

(10) Patent No.: US 11,421,646 B1
(45) Date of Patent: Aug. 23, 2022

(54) SEA WAVE POWER GENERATING APPARATUS

(71) Applicant: Jen-Che Hung, Taichung (TW)

(72) Inventor: Jen-Che Hung, Taichung (TW)

( * ) Notice: Subject to any disclaimer, the term of this patent is extended or adjusted under 35 U.S.C. 154(b) by 0 days.

(21) Appl. No.: 17/342,357

(22) Filed: Jun. 8, 2021

(51) Int. Cl.
| | |
|---|---|
| *F03B 13/22* | (2006.01) |
| *F03B 13/18* | (2006.01) |
| *H02K 7/18* | (2006.01) |
| *H02K 7/116* | (2006.01) |
| *H02K 7/20* | (2006.01) |

(52) U.S. Cl.
CPC ............ *F03B 13/22* (2013.01); *F03B 13/186* (2013.01); *H02K 7/116* (2013.01); *H02K 7/1853* (2013.01); *H02K 7/20* (2013.01)

(58) Field of Classification Search
CPC ....... F03B 13/22; F03B 13/186; H02K 7/116; H02K 7/1853; H02K 7/20
See application file for complete search history.

(56) References Cited

U.S. PATENT DOCUMENTS

| | | | | |
|---|---|---|---|---|
| 4,184,336 A | * | 1/1980 | Lamberti | F03B 13/186 60/507 |
| 4,931,662 A | * | 6/1990 | Burton | F03B 13/1815 60/507 |
| 9,957,018 B1 | * | 5/2018 | Angeliev | H02K 7/07 |
| 2018/0030953 A1 | * | 2/2018 | Stapelmann | F03B 13/189 |

FOREIGN PATENT DOCUMENTS

GB   2553216 A  *  2/2018  ............. F03B 13/14

* cited by examiner

*Primary Examiner* — Viet P Nguyen

(57) ABSTRACT

A sea wave power generating apparatus comprises a frame, a platform secured on an upper portion of the frame, a floating panel pivotally secured to the frame and flapping upwardly or downwardly by the oscillation of the sea waves, a level controlling device slidably held on the platform for raising or lowering the floating panel to be normally submerged under a sea water level, and a power generating device mounted on the platform and having a rack pivotally secured to a rear portion of the floating panel and engaged with a pinion of the power generating device for converting the kinetic energy due to the upward or downward flapping movements of the floating panel into electrical energy.

7 Claims, 3 Drawing Sheets

SEA WAVE POWER GENERATING APPARATUS

BACKGROUND OF THE INVENTION

U.S. Pat. No. 8,541,901 disclosed a wave power generating installation for converting the sea wave energy into electrical energy.

However, such a prior art has the following drawbacks:

1. The sea wave, when entering the opening (17) of the chamber (10), will greatly reduce its energy due to friction loss caused by sea water flowing through the opening and walls of the chamber, thereby reducing the output energy of the installation.

2. Barnacles, organisms and scales in the sea water may be deposited or accumulated in an aperture between the walls (11, 14) of the chamber (10) and the float body (20) to obstruct or blockade the reciprocative movement of the float body within the walls of the chamber, thereby influencing or interrupting the upward or downward movements of the float body, and finally reducing the energy output efficiency.

The present inventor has found the drawbacks of the conventional wave power generating installation, and invented the present sea wave power generating apparatus.

SUMMARY OF THE INVENTION:

The object of the present invention is to provide a sea wave power generating apparatus comprising a frame, a platform secured on an upper portion of the frame, a floating panel pivotally secured to a rear portion of the frame and flapping upwardly or downwardly by the oscillation of the sea waves, a level controlling device slidably held on the platform for raising or lowering the floating panel to be normally submerged under a sea water level, and a power generating device mounted on the platform and having a rack pivotally secured to a rear portion of the floating panel and reciprocatively passing through the platform to be engaged with a pinion of the power generating device for converting the kinetic energy due to the upward or downward flapping movements of the floating panel into electrical energy which is output through the power generating device.

DETAILED DESCRIPTION

Figure 1:
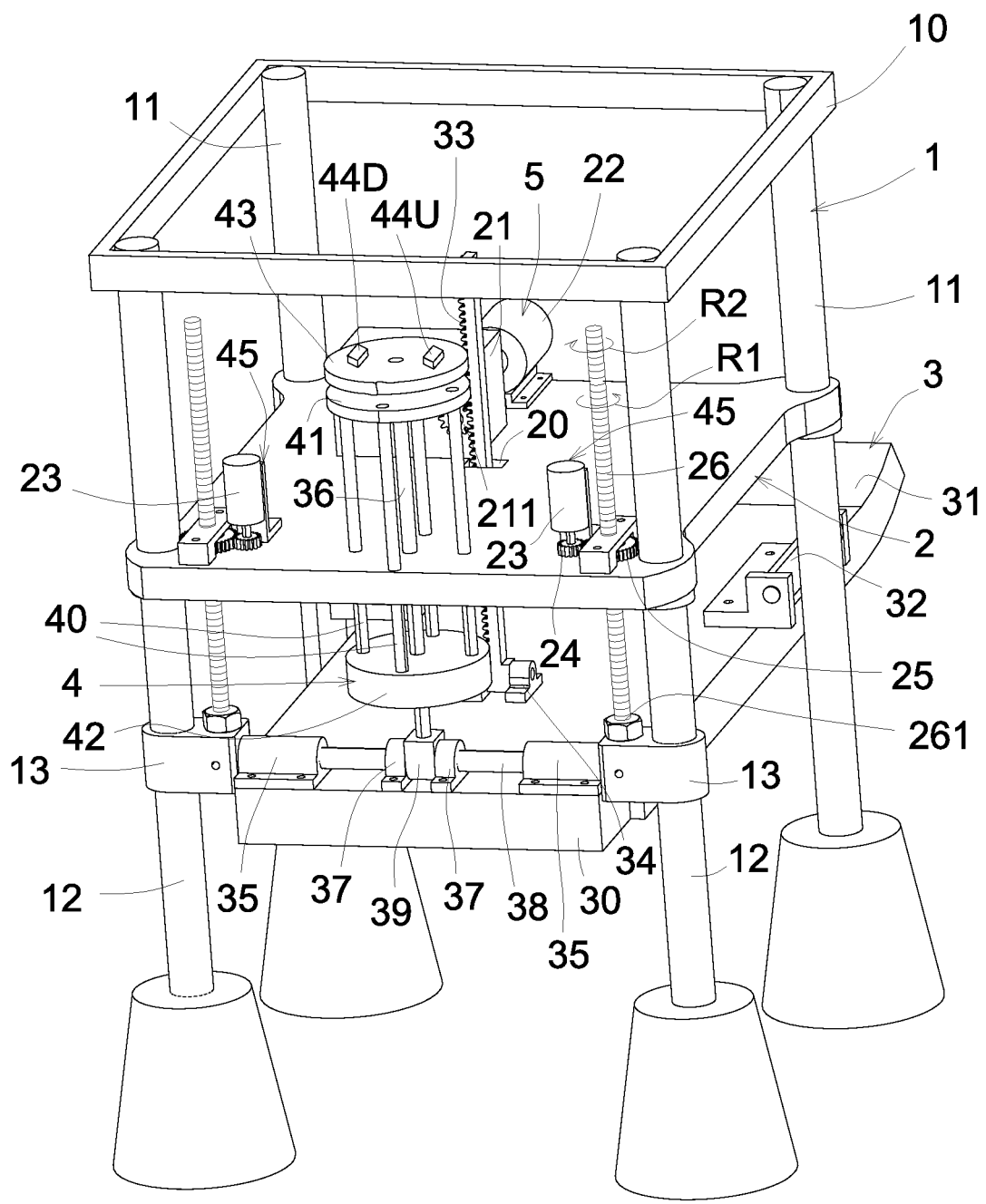
FIG. 1 is a perspective illustration of the present invention.
Figure 2:
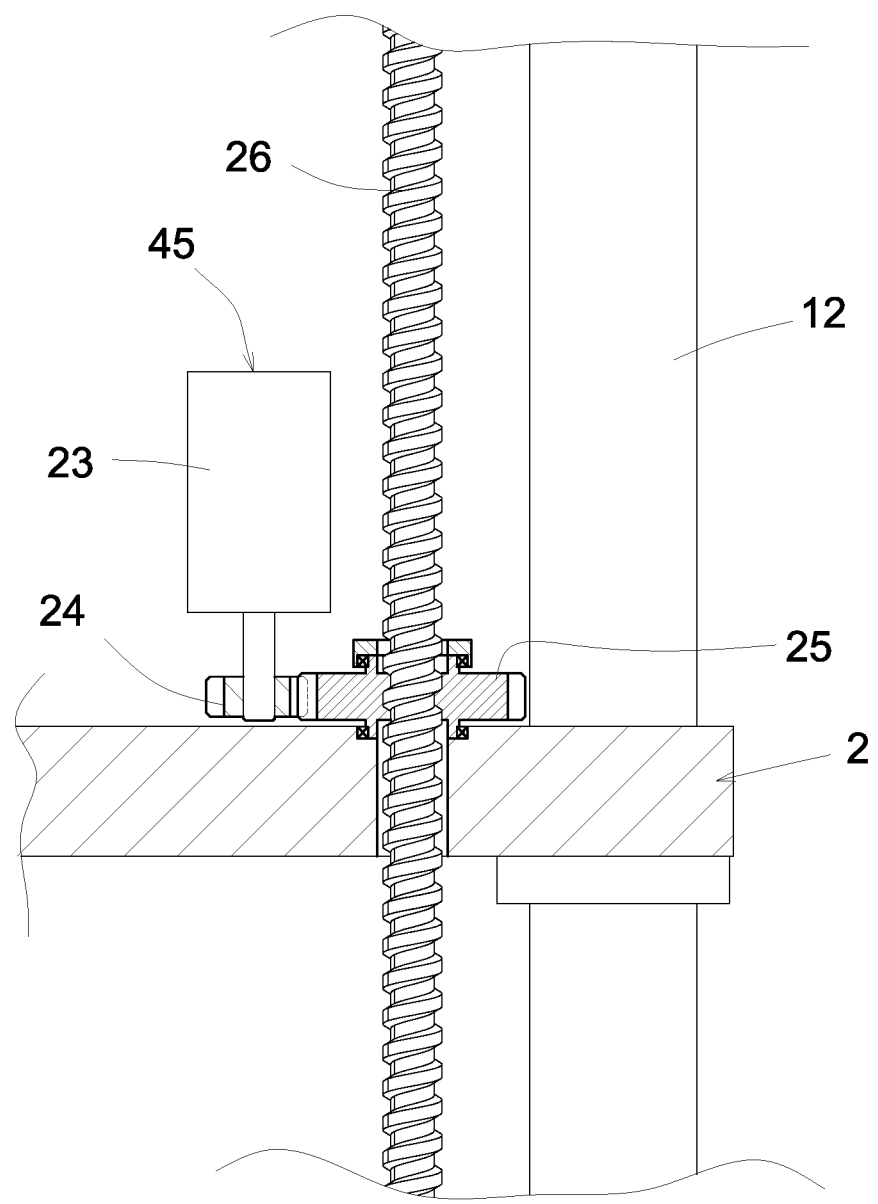
FIG. 2 is an enlarged view of the level controlling device of the present invention.
Figure 3:
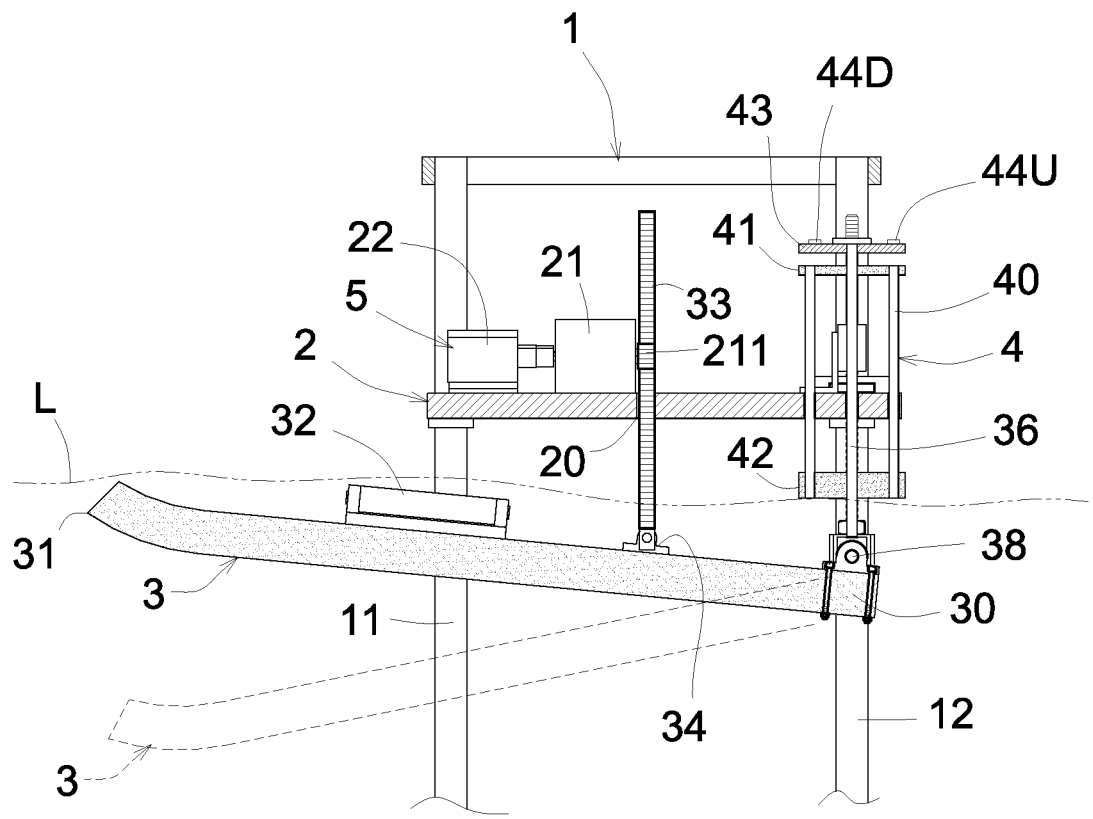
FIG. 3 is a sectional drawing of the present invention.

As shown in the drawing figures, the present invention comprises: a frame 1; a platform 2 secured to the frame 1; a floating panel 3 pivotally secured to the frame 1; a level controlling device 4 slidably held on the platform 2 to normally submerge the floating panel 3 under a sea water level L; and a power generating device 5 mounted on the platform 2 and operatively actuated by the floating panel as flapping upwardly or downwardly by the oscillating sea waves for converting the kinetic energy of the flapping panel into electricity.

The frame 1 includes: a pair of front columns 11 disposed on a front side of the frame 1, and a pair of rear columns 12 disposed on a rear side of the frame 1, and a top frame member 10 linking the two front columns 11 and the two rear columns 12 to be a generally rectangular frame structure as shown in FIG. 1. The four columns 11, 12 may be secured to a sea bottom.

The platform 2 is secured to the four columns 11, 12 of the frame 1 and positioned on an upper portion of the frame 1, adjacent to the top frame member 10.

The floating panel 3 includes a front bending portion 31 bending upwardly for receiving incoming sea waves; a rear pivotal portion 30 pivotally secured on a shaft 38 transversely secured between a pair of loops 13 adjustably held on the two rear columns 12 to pivotally flap the floating panel 3 about the shaft 38; and a pair of roller sets 32 formed on opposite front portions of the floating panel 3 to be slidably rotatably engageable with the two front columns 11 for stably guiding the floating panel 3 within the two front columns 11.

The floating panel 3 may he formed as a hollow structure. A valve 3a may be formed in the panel 3 adapted for inflating the panel 3 through such a valve 3a.

The floating panel 3 includes a pair of side bushings 35 disposed on opposite end portions of the rear portion 30 of the panel 3 for rotatably engaging the shaft 38 in the two side bushings 35; and a pair of middle bushings 37 formed on a rear middle portion of the panel 3 for rotatably engaging the shaft 38 in the two middle bushings 37.

The level controlling device 4 includes a central stem 36 secured to a collar 39 slidably engageable with the shaft 38 of the floating panel 3 and protruding upwardly to pass through a stem hole formed through the platform 2; a top disk 43 secured on a top end of the stem 36; a float 42 slidably engageable with the stem 36 and upwardly limited by the platform 2; a plurality of guiding rods 40 circumferentially formed on the float and disposed around the stem 36 and protruding upwardly through a plurality of rod holes formed through the platform 2; an upper disk 41 secured to each top end of the stem 36 and the guiding rods 40, and upwardly limited by the top disk 43; a lowering controller 44D and a raising controller 44U respectively formed on the top disk 43 for lowering the floating panel 3 or raising the floating panel 3 corresponding to the low tide or high tide (or corresponding to the low water level of high water level) for receiving the incoming oscillating sea waves for power generation.

The lowering controller 44D includes a low-level sensor (not shown) to detect a low water level when meeting low tide of the sea water, and a lowering switch (not shown) operatively actuated when meeting the low tide for lowering the floating panel 3 through a pair of actuating devices 45 disposed on opposite side portions of the platform 2.

The raising controller 44U includes a high-level sensor (not shown) to detect a high water level when meeting high tide of the sea water, and a raising switch (not shown) operatively actuated when meeting the high tide for raising the floating panel 3 through a pair of actuating devices 45 disposed on the platform 2.

The actuating device 45 includes a motor 23 mounted on the platform 2 and having a motor gear 24 secured to a motor shaft; a driving gear 25 engageable with the motor gear 24 and rotatably mounted on the platform 2; a screw rod 26 having male threads formed on the screw rod 26 and engageable with a female-threaded hole (not shown) formed in the driving gear 25, with the screw rod 26 reciprocatively moving downwardly or upwardly through a rod opening formed through the platform 2 and with a lower rod end 261 of the screw rod 26 rotatably secured to a loop 13 adjustably held on the rear column 12; whereby upon lowering of the float 42 to trigger the lowering controller 44D, the lower switch (or the forward-rotation switch) will actuate a forward rotation R1 of the motor 23 to lower the screw rod 26 and lower the loop 13 as well as the floating panel 3 in order to allow the panel to receive the oscillating sea waves at low tide for power generation; or whereby upon rising of the float 42 to trigger the raising controller 44U, the raising switch (or the reverse-rotation switch) will actuate a reverse rotation R2 of the motor 23 to raise the screw rod 26 and the loop 13 as well as the floating panel 3 in order to allow the panel to receive the oscillating sea waves at high tide for power generation too.

The power generating device 5 includes a power generator 22; a gear-speed variator 21 connected to the power generator 22 and having an input pinion 211 secured to an input shaft (not shown) of the gear-speed variator 2; a rack 33 engageable with the input pinion 211 and having a lower rack end pivotally secured to the floating panel 3 by a pair of brackets 34 formed on the panel 3, with the rack 33 protruding upwardly through a rack hole 20 formed in the platform 2; whereby upon an oscillation by the incoming sea waves, the floating panel 3 will flap upwardly or downwardly to raise the rack 33 upwardly or to lower the rack 33 downwardly to engageably rotate the pinion 211 of the gear-speed variator 21, and to rotate the power generator 22 for power generation. The gear-speed variator 21 may be modified to involve a clutch (not shown) to always output a forward rotation of the power generator 22 regardless of upward or downward movement of the rack, or regardless of a forward or reverse rotation of the gear-speed variator 21.

The present invention has the following advantages or functions superior to a prior art or a conventional sea wave power generator:

1. The floating panel 3 may free "catch" the incoming oscillating sea waves without considering the friction loss of the incoming sea waves, to thereby increase the power-generation efficiency.

2. The barnacles or scales are uninfluenced since there is no aperture in the moving parts to be available for the accumulation of barnales or scales from the sea water.

3. No mater low tide or high tide of the sea water level, the float 42 will float on the sea water level to control the float panel 3 to be always impacted by the sea waves, thereby increasing the power generation efficiency.

I claim:

1. A sea wave power generating apparatus comprising: a frame (1); a platform (2) secured to the frame (1); a floating panel (3) pivotally secured to the frame (1) and including a front bending portion (31) bending upwardly for receiving incoming sea waves; a rear pivotal portion (30) pivotally secured on a shaft (38) transversely secured between a pair of loops (13) adjustably held on two rear columns (12) of the frame (1) to pivotally flap the floating panel (3) about the shaft (38); and a pair of roller sets (32) formed on opposite front portions of the floating panel (3) to be slidably rotatably engageable with two front columns (11) of the frame (1) for stably guiding the floating panel (3) within the two front columns (11); a level controlling device (4) slidably held on the platform (2) to normally submerge the floating panel (3) under a sea water level (L); and a power generating device (5) mounted on the platform (2) and operatively actuated by the floating panel as flapping upwardly or downwardly by the oscillating sea waves for converting the kinetic energy of the flapping panel into electricity.

2. A sea wave power generating apparatus according to claim 1, wherein said floating panel (3) includes a pair of side bushings (35) disposed on opposite end portions of the rear portion (30) of the panel (3) for rotatably engaging the shaft (38) in the two side bushings (35); and a pair of middle bushings (37) formed on a rear middle portion of the panel (3) for rotatably engaging the shaft (38) in the two middle bushings (37).

3. A sea wave power generating apparatus according to claim 1, wherein said level controlling device (4) includes a central stem (36) secured to a collar (39) slidably engageable with a shaft (38) of the floating panel (3) and protruding upwardly to pass through a stem hole formed through the platform (2); a top disk (43) secured on a top end of the stem (36); a float (42) slidably engageable with the stem (36) and upwardly limited by the platform (2); a plurality of guiding rods (40) circumferentially formed on the float (42) and disposed around the stem (36) and protruding upwardly through a plurality of rod holes formed through the platform (2); an upper disk (41) secured to each top end of the stem (36) and the guiding rods (40), and upwardly limited by the top disk (43); a lowering controller (44D) and a raising controller (44U) respectively formed on the top disk (43) for operating an actuating device (45) for lowering the floating panel (3) or raising the floating panel (3) corresponding to the low tide or high tide for receiving the incoming oscillating sea waves for power generation.

4. A sea wave power generating apparatus according to claim 3, wherein said lowering controller (44D) includes a low-level sensor to detect a low water level when meeting low tide of the sea water, and a lowering switch operatively actuated when meeting the low tide for lowering the floating panel (3) through a pair of actuating devices (45) disposed on opposite side portions of the platform (2).

5. A sea wave power generating apparatus according to claim 3, wherein said raising controller (44U) includes a high-level sensor to detect a high water level when meeting high tide of the sea water, and a raising switch operatively actuated when meeting the high tide for raising the floating panel (3) through a pair of actuating devices (45) disposed on the platform (2).

6. A sea wave power generating apparatus according to claim 3, wherein said actuating device (45) includes a motor (23) mounted on the platform (2) and having a motor gear (24) secured to a motor shaft; a driving gear (25) engageable with the motor gear (24) and rotatably mounted on the platform (2); a screw rod (26) having male threads formed on the screw rod (26) and engageable with a female-threaded hole formed in the driving gear (25), with the screw rod (26) reciprocatively moving downwardly or upwardly through a rod opening formed through the platform (2) and with a lower rod end (261) of the screw rod (26) rotatably secured to a loop (13) adjustably held on a rear column (12) of a frame (1); whereby upon lowering of the float (42) to trigger the lowering controller (44D), the lowering switch will actuate a forward rotation (R1) of the motor (23) to lower the screw rod (26) and lower the loop (13) as well as the floating panel (3) in order to allow the floating panel (3) to receive the oscillating sea waves at low tide for power generation; or whereby upon rising of the float (42) to trigger the raising controller (44U), the raising switch will actuate a reverse rotation (R2) of the motor (23) to raise the screw rod (26) and the loop (13) as well as the floating panel (3) in order to allow the floating panel to receive the oscillating sea waves at high tide for power generation too.

7. A sea wave power generating apparatus according to claim 1, wherein said power generating device (5) includes a power generator (22); a gear-speed variator (21) connected to the power generator (22) and having an input pinion (211)

secured to an input shaft of the gear-speed variator (21); a rack (33) engageable with the input pinion (211) and having a lower rack end pivotally secured to the floating panel (3) by a pair of brackets (34) formed on the panel (3), with the rack (33) protruding upwardly through a rack hole (20) formed in the platform (2); whereby upon an oscillation by the incoming sea waves, the floating panel (3) will flap upwardly or downwardly to raise the rack (33) upwardly or to lower the rack (33) downwardly to engageably rotate the pinion (211) of the gear-speed variator (21), and to rotate the power generator (22) for power generation.

\* \* \* \* \*